(12) United States Patent
Nemirovsky et al.

(10) Patent No.: US 7,502,876 B1
(45) Date of Patent: Mar. 10, 2009

(54) BACKGROUND MEMORY MANAGER THAT DETERMINES IF DATA STRUCTURES FITS IN MEMORY WITH MEMORY STATE TRANSACTIONS MAP

(75) Inventors: Mario Nemirovsky, Saratoga, CA (US);
Narendra Sankar, Campbell, CA (US);
Adolfo Nemirovsky, San Jose, CA (US);
Enric Musoll, San Jose, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 717 days.

(21) Appl. No.: 09/602,279

(22) Filed: Jun. 23, 2000

(51) Int. Cl.
*G06F 13/00* (2006.01)
*G06F 12/08* (2006.01)
*G06F 12/00* (2006.01)

(52) U.S. Cl. .................. 710/22; 710/3; 710/4; 710/23; 710/56; 709/104; 709/108; 711/100; 711/102; 711/170; 711/171; 718/106; 718/107; 718/108

(58) Field of Classification Search ...................... 710/3, 710/4, 22, 23, 56; 709/104, 108; 711/100, 711/102, 171, 170; 718/106–108
See application file for complete search history.

(56) References Cited

U.S. PATENT DOCUMENTS

| | | | |
|---|---|---|---|
| 4,200,927 A | 4/1980 | Huges et al. | |
| 4,707,784 A | 11/1987 | Ryan et al. | |
| 4,942,518 A | 7/1990 | Weatherford et al. | |
| 5,023,776 A | 6/1991 | Gregor | |
| 5,121,383 A | 6/1992 | Golestani | |
| 5,291,481 A | 3/1994 | Doshi et al. | |
| 5,408,464 A | 4/1995 | Jurkevich | |
| 5,465,331 A | 11/1995 | Yang et al. | |
| 5,471,598 A | 11/1995 | Quattromani et al. | |
| 5,521,916 A | 5/1996 | Choudhury et al. | |
| 5,559,970 A | 9/1996 | Sharma | |

(Continued)

FOREIGN PATENT DOCUMENTS

WO    WO 03/05645 A2    6/2002

(Continued)

OTHER PUBLICATIONS

Knuth, Donald E., "The Art of Computer Programming, vol. 1, Fundamental Algorithms", "Sec. 2.5 Dynamic Storage Allocation", 1997, pp. 435-456, Addison-Wesley, US.

(Continued)

*Primary Examiner*—Tammara Peyton
(74) *Attorney, Agent, or Firm*—Sterne, Kessler, Goldstein & Fox P.L.L.C.

(57) ABSTRACT

A background memory manager (BMM) for managing a memory in a data processing system has circuitry for transferring data to and from an outside device and to and from a memory, a memory state map associated with the memory, and a communication link to a processor. The BMM manages the memory, determining if each data structure fits into the memory, deciding exactly where to place the data structure in memory, performing all data transfers between the outside device and the memory, and maintaining the memory state map according to memory transactions made, and informing the processor of new data and its location. In preferred embodiments the BMM, in the process of storing data structures into the memory, provides an identifier for each structure to the processor. The system is particularly applicable to Internet packet processing in packet routers.

25 Claims, 3 Drawing Sheets

U.S. PATENT DOCUMENTS

| | | | |
|---|---|---|---|
| 5,619,497 | A | 4/1997 | Gallagher et al. |
| 5,634,015 | A | 5/1997 | Chang et al. |
| 5,659,797 | A * | 8/1997 | Zandveld et al. .............. 710/22 |
| 5,675,790 | A | 10/1997 | Walls |
| 5,684,797 | A | 11/1997 | Aznar et al. |
| 5,708,814 | A | 1/1998 | Short et al. |
| 5,724,565 | A | 3/1998 | Dubey et al. |
| 5,737,525 | A | 4/1998 | Picazo et al. |
| 5,784,649 | A | 7/1998 | Begur et al. |
| 5,784,699 | A | 7/1998 | McMahon et al. |
| 5,796,966 | A | 8/1998 | Simcoe et al. |
| 5,809,321 | A | 9/1998 | Hansen et al. |
| 5,812,810 | A | 9/1998 | Sager |
| 5,835,491 | A | 11/1998 | Davis et al. |
| 5,892,966 | A | 4/1999 | Petrick et al. |
| 5,918,050 | A * | 6/1999 | Rosenthal et al. ........... 709/108 |
| 5,951,679 | A | 9/1999 | Anderson et al. |
| 5,978,570 | A | 11/1999 | Hillis |
| 5,978,893 | A | 11/1999 | Bakshi et al. |
| 5,987,578 | A | 11/1999 | Butcher |
| 6,009,516 | A | 12/1999 | Steiss et al. |
| 6,016,308 | A | 1/2000 | Crayford et al. |
| 6,023,738 | A * | 2/2000 | Priem et al. .................... 710/23 |
| 6,047,122 | A | 4/2000 | Spiller |
| 6,058,267 | A | 5/2000 | Kanai et al. |
| 6,067,608 | A | 5/2000 | Perry |
| 6,070,202 | A | 5/2000 | Minkoff et al. |
| 6,073,251 | A | 6/2000 | Jewett et al. |
| 6,088,745 | A | 7/2000 | Bertagna et al. |
| 6,131,163 | A | 10/2000 | Wiegel |
| 6,151,644 | A | 11/2000 | Wu |
| 6,157,955 | A | 12/2000 | Narad et al. |
| 6,169,745 | B1 | 1/2001 | Liu et al. |
| 6,173,327 | B1 | 1/2001 | De Borst et al. |
| 6,195,680 | B1 | 2/2001 | Goldszmidt et al. |
| 6,219,339 | B1 | 4/2001 | Doshi et al. |
| 6,219,783 | B1 | 4/2001 | Zahir et al. |
| 6,223,274 | B1 * | 4/2001 | Catthoor et al. ............... 712/34 |
| 6,226,680 | B1 | 5/2001 | Boucher et al. |
| 6,247,040 | B1 | 6/2001 | Born et al. |
| 6,247,105 | B1 | 6/2001 | Goldstein et al. |
| 6,249,801 | B1 | 6/2001 | Zisapel et al. |
| 6,249,846 | B1 | 6/2001 | Van Doren et al. |
| 6,253,313 | B1 | 6/2001 | Morrison et al. |
| 6,263,452 | B1 | 7/2001 | Jewett et al. |
| 6,377,972 | B1 | 4/2002 | Guo et al. |
| 6,381,242 | B1 | 4/2002 | Maher, III et al. |
| 6,389,468 | B1 | 5/2002 | Muller et al. |
| 6,393,028 | B1 | 5/2002 | Leung |
| 6,438,135 | B1 | 8/2002 | Tzeng |
| 6,453,360 | B1 | 9/2002 | Muller et al. |
| 6,460,105 | B1 | 10/2002 | Jones et al. |
| 6,483,804 | B1 | 11/2002 | Muller et al. |
| 6,502,213 | B1 | 12/2002 | Bowman-Amuah |
| 6,523,109 | B1 | 2/2003 | Meier |
| 6,529,515 | B1 | 3/2003 | Raz et al. |
| 6,535,905 | B1 | 3/2003 | Kalafatis et al. |
| 6,549,996 | B1 * | 4/2003 | Manry et al. ................. 711/203 |
| 6,581,102 | B1 | 6/2003 | Amini et al. |
| 6,614,796 | B1 | 9/2003 | Black et al. |
| 6,618,820 | B1 | 9/2003 | Krum |
| 6,625,808 | B1 | 9/2003 | Tarditi |
| 6,640,248 | B1 | 10/2003 | Jorgensen |
| 6,650,640 | B1 | 11/2003 | Muller et al. |
| 6,738,371 | B1 | 5/2004 | Ayres |
| 6,738,378 | B2 | 5/2004 | Tuck, III et al. |
| 6,792,509 | B2 * | 9/2004 | Rodriguez .................. 711/129 |
| 6,813,268 | B1 | 11/2004 | Kalkunte et al. |
| 6,820,087 | B1 * | 11/2004 | Langendorf et al. ......... 707/101 |
| 6,965,982 | B2 | 11/2005 | Nemawarkar |
| 7,032,226 | B1 | 4/2006 | Nemirovsky et al. |
| 7,065,096 | B2 | 6/2006 | Musoll et al. |
| 2001/0004755 | A1 | 6/2001 | Levy et al. |
| 2001/0005253 | A1 | 6/2001 | Komatsu |
| 2001/0024456 | A1 | 9/2001 | Zaun et al. |
| 2001/0043610 | A1 | 11/2001 | Nemirovsky et al. |
| 2001/0052053 | A1 | 12/2001 | Nemirovsky et al. |
| 2002/0016883 | A1 | 2/2002 | Musoll et al. |
| 2002/0049964 | A1 | 4/2002 | Takayama et al. |
| 2002/0054603 | A1 | 5/2002 | Mussoll et al. |
| 2002/0071393 | A1 | 6/2002 | Musoll |
| 2002/0083173 | A1 | 6/2002 | Musoll et al. |
| 2002/0124262 | A1 | 9/2002 | Basso et al. |
| 2004/0015598 | A1 | 1/2004 | Jin-Fun |
| 2004/0148382 | A1 | 7/2004 | Narad et al. |
| 2004/0172471 | A1 | 9/2004 | Porter |
| 2004/0172504 | A1 | 9/2004 | Balazich et al. |
| 2004/0213251 | A1 | 10/2004 | Tran et al. |
| 2005/0061401 | A1 | 3/2005 | Tokoro et al. |
| 2005/0066028 | A1 | 3/2005 | Illikkai et al. |
| 2006/0036705 | A1 | 2/2006 | Musoll et al. |
| 2006/0090039 | A1 | 4/2006 | Jain et al. |
| 2006/0153197 | A1 | 7/2006 | Nemirovsky et al. |
| 2006/0159104 | A1 | 7/2006 | Nemirovsky et al. |
| 2006/0215670 | A1 | 9/2006 | Sampath et al. |
| 2006/0215679 | A1 | 9/2006 | Musoll et al. |
| 2006/0225080 | A1 | 10/2006 | Nemirovsky et al. |
| 2007/0008989 | A1 | 1/2007 | Joglekar |
| 2007/0074014 | A1 | 3/2007 | Musoll et al. |

OTHER PUBLICATIONS

Diefendorff, Keith, K7 Challenges Intel, Microprocessor Report, Oct. 26, 1998, vol. 12, No. 14, US.

Potel, M. J. "Real-Time Playback in Animation Systems." Proceedings of the 4th Annual Conference on Computer Graphics and Interactive Techniques. 1977. pp. 72-77. San Jose, CA, US.

ARM Architecture Reference Manual. 1996. pp. 3-41, 3-42, 3-43, 3-67, and 3-68. Prentice Hall, NJ, US.

ESA/390 Principles of Operation. IBM Online Publications Center Reference No. SA22-7201-08. Table of Contents and paras. 7.5.31 and 7.5.70. IBM Corporation. Boulder, CO, US.

MC88110 Second Generation RISC Microprocessor User's Manual. 1991. pp. 10-66, 10-67, and 10-71. Motorola, Inc.

Diefendorff et al. "Organization of the Motorola 88110 Superscalar RISC Microprocessor." IEEE Journal of Microelectronics. Apr. 1992. pp. 40-63. vol. 12, No. 2. IEEE. New York, NY, US.

Kane, Gerry. PA-RISC 2.0 Architecture. 1996, pp. 7-106 and 7-107. Prentice Hall. NJ, US.

Diefendorff et al. "AltiVec Extension to PowerPC Accelerates Media Processing." IEEE Journal of Microelectronics. vol. 20, No. 2 (2000): pp. 85-95.

Grunewald et al. "Towards Extremely Fast Context Switching in a Block Multithreaded Processor." Proceedings of EUROMICRO 22, 1996. pp. 592-599.

Bradford et al. "Efficient Synchronization for Multithreaded Processors." Workshop on Multithreaded Execution, Architecture, and Compilation. Jan.-Feb. 1998. pp. 1-4.

Pai et al. "An Evaluation of Memory Consistency Models for Shared-Memory Systems with ILP Processors." Proceedings of ASPLOS-VII, Oct. 1996: pp. 12-23, ACM, Inc.

Yoaz et al. "Speculation Techniques for Improving Load Related Instruction Scheduling." 1999. pp. 42-53, IEEE.

Donalson et al. "DISC: Dynamic Instruction Stream Computer, An Evaluation of Performance." 26th Hawaii Conference on Systems Sciences. vol. 1. 1993. pp. 448-456.

Nemirovsky et al. "DISC: Dynamic Instruction Stream Computer." ACM. 1991. pp. 163-171.

Musoll et al. Mechanism to Prevent the Download of a Packet with Pending Writes Affecting Its Data. Apr. 11, 2001. Disclosure Document #492430, USTPO.

Ungerer et al. A Survey of Processors with Explicit Multithreading. ACM Computing Surveys, vol. 35, No. 1. Mar. 2003. pp. 29-63.

U.S. Appl. No. 09/591,510, filed Jun. 12, 2000, Gellnas et al.

Kessler, R. E. "The Alpha 21264 Microprocessor: Out-of-Order Execution at 600 MHz." Aug. 1998.

Melvin et al., "Extended Instruction Set for a Packet Processing Applications," Jul. 5, 2001, Disclosure Document #496559, USPTO.

Musoll et al., "Hardware Algorithm for Allocating and De-Allocating Consecutive Blocks of Memory," Apr. 3, 2001, Disclosure Document #491557, USPTO.

Musoll et al., "Mechanism to Overflow Packets to a Software Controlled Memory When They Do Not Fit Into a Hardware Controlled Memeory,", Jul. 3, 2001, Disclosure Document #496391, USPTO.

Musoll et al., "Mechanism for Allowing a Limited Packet Head and/or Tall Growth Without Moving the Packet to a Different Memeory Location," Apr. 16, 2001, Disclosure Document #492429, USPTO.

Musoll et al., Mechanism to Activate a Context When No Stream Is Running In a Multi-Streaming Processing Core,: Apr. 16, 2001, Disclosure Document #492431, USPTO.

Musoll, Enrique, "Functional Validation of a Packet Management Unit," May 18, 2001, Disclosure Document #429011, USPTO.

Sampath et al., "Mechanism to Un-speculatively Pre-fetch Instructions from the Thread Associated to a Packet," Apr. 2, 2001, Disclosure Document #491527, USPTO.

Yamamoto, Wayne. An Analysis of Multistreamed, Superscalar Processor Architectures. University of California Santa Barbara Dissertation. Dec. 1995. Santa Barbara, US.

Yamamoto et al. "Increasing Superscalar Performance Through Multistreaming." Parallel Architectures and Compilation Techniques (PACT '95). 1995.

The PowerPC Architecture: A Specification for a New Family of RISC Processors. 2nd Ed. May 1994. pp. 70-72. Morgan Kaufmann. San Francisco, US.

MC68020 32-Bit Microprocessor User's Manual. 3rd Ed.. 1989. pp. 3-125, 3-126, and 3-127. Prentice Hall, NJ, US.

\* cited by examiner

BACKGROUND MEMORY MANAGER THAT DETERMINES IF DATA STRUCTURES FITS IN MEMORY WITH MEMORY STATE TRANSACTIONS MAP

FIELD OF THE INVENTION

The present invention is in the area of integrated circuit microprocessors, and pertains in particular to memory management, and the use of microprocessor resources in such management.

BACKGROUND OF THE INVENTION

Microprocessors, as is well-known in the art, are integrated circuit (IC) devices that are enabled to execute code sequences which may be generalized as software. In the execution most microprocessors are capable of both logic and arithmetic operations, and typically modern microprocessors have on-chip resources (functional units) for such processing.

Microprocessors in their execution of software strings typically operate on data that is stored in memory. This data needs to be brought into the memory before the processing is done, and sometimes needs to be sent out to a device that needs it after its processing.

There are in the state-of-the-art two well-known mechanisms to bring data into the memory and send it out to a device when necessary. One mechanism is loading and storing the data through a sequence of Input/Output (I/O) instructions. The other is through a direct-memory access device (DMA).

In the case of a sequence of I/O instructions, the processor spends significant resources in explicitly moving data in and out of the memory. In the case of a DMA system, the processor programs an external hardware circuitry to perform the data transferring. The DMA circuitry performs all of the required memory accesses to perform the data transfer to and from the memory, and sends an acknowledgement to the processor when the transfer is completed.

In both cases of memory management in the art the processor has to explicitly perform the management of the memory, that is, to decide whether the desired data structure fits into the available memory space or does not, and where in the memory to store the data. To make such decisions the processor needs to keep track of the regions of memory wherein useful data is stored, and regions that are free (available for data storage). Once that data is processed, and sent out to another device or location, the region of memory formerly associated with the data is free to be used again by new data to be brought into memory. If a data structure fits into the available memory, the processor needs to decide where the data structure will be stored. Also, depending on the requirements of the processing, the data structure can be stored either consecutively, in which case the data structure must occupy one of the empty regions of memory; or non-consecutively, wherein the data structure may be partitioned into pieces, and the pieces are then stored into two or more empty regions of memory.

An advantage of consecutively storing a data structure into memory is that the accessing of this data becomes easier, since only a pointer to the beginning of the data is needed to access all the data.

When data is not consecutively stored into the memory, access to the data becomes more difficult because the processor needs to determine the explicit locations of the specific bytes it needs. This can be done either in software (i.e. the processor will spend its resources to do this task) or in hardware (using a special circuitry). A drawback of consecutively storing the data into memory is that memory fragmentation occurs. Memory fragmentation happens when the available chunks of memory are smaller than the data structure that needs to be stored, but the addition of the space of the available chunks is larger than the space needed by the data structure. Thus, even though enough space exists in the memory to store the data structure, it cannot be consecutively stored. This drawback does not exist if the data structure is allowed to be non-consecutively stored.

Still, a smart mechanism is needed to generate the lowest number of small regions, since the larger the number of small regions that are used by a data structure, the more complex the access to the data becomes (more specific regions need to be tracked) regardless of whether the access is managed in software or hardware as explained above.

What is clearly needed is system for background management of memory in systems where large amounts of data must be moved to and from a memory for processing.

SUMMARY OF THE INVENTION

In a preferred embodiment of the present invention a background memory manager (BMM) for managing a memory in a data processing system is provided, the BMM comprising circuitry for transferring data to and from an outside device and to and from a memory, a memory state map associated with the memory, and a communication link to a processor. The BMM manages the memory, performing all data transfers between the outside device and the memory, and maintains the memory state map according to memory transactions made.

In preferred embodiments the BMM, after storing a data structure into the memory, provides a data identifier for the structure on the link to the processor. Also in preferred embodiments, the BMM, in making memory transactions, updates the memory state map to the new memory state, keeping track of regions occupied by valid data and regions not occupied by valid data.

In some embodiments the BMM, in response to a signal on the processor link that the processor is finished with certain identified data in the memory, copies the data from the memory to another device, and updates the memory state map to indicate the region of the data copied. There may further be an interrupt handler allowing a remote data source to interrupt the BMM when data is available to be transferred to the memory. The BMM in preferred embodiments is particularly suited for handling data packets in a packet processing router.

In another aspect of the invention a data processing system is provided, comprising a processor, a memory coupled to the processor, and a background memory manager coupled to the memory and the processor, the background memory manager including circuitry for transferring data to and from an outside device and to and from the memory, and a memory state map associated with the memory. The BMM manages the memory, performing all data transfers between the outside device and the memory, and maintains the memory state map according to memory transactions made.

In preferred embodiments of the system the BMM, after storing a data structure into the memory, provides a data identifier for the structure to the processor. Also in preferred embodiments the BMM, in making memory transactions, updates the memory state map to the new memory state, keeping track of regions occupied by valid data and regions not occupied by valid data.

In some embodiments of the system the BMM, in response to a signal from the processor that the processor is finished with certain identified data in the memory, copies the data from the memory to another device, and updates the memory state map to indicate the region of the data copied. In some embodiments there is an interrupt handler allowing a remote data source to interrupt the BMM when data is available to be transferred to the memory. The data processing system is particularly suited to processing data packets in Internet packet processors.

In yet another aspect of the invention a network packet router is provided, comprising an input/output (I/O) device for receiving and sending packets on the network, a processor, a memory coupled to the processor, and a background memory manager coupled to the memory and the processor, the background memory manager including circuitry for transferring packets to and from the I/O device and to and from the memory, and a memory state map associated with the memory. The BMM manages the memory, performing all packet transfers between the I/O device and the memory, and maintains the memory state map according to memory transactions made.

In a preferred embodiment the BMM, after storing a packet into the memory, provides a data identifier for the packet to the processor. Also in a preferred embodiment the BMM, in making memory transactions, updates the memory state map to the new memory state, keeping track of regions occupied by valid packets and regions not occupied by valid packets.

In some embodiments the BMM, in response to a signal that the processor is finished with a packet in the memory, copies the packet from the memory to the I/O device, and updates the memory state map to indicate the region of the packet copied. There may also be an interrupt handler allowing the I/O device to interrupt the BMM when packets are available to be transferred to the memory.

In still another aspect of the present invention a method for managing a memory in a data processing system is provided, comprising the steps of (a) transferring data to and from an outside device and to and from the memory by circuitry in a background memory manager (BMM); (b) updating a memory state map associated with the memory in the BMM each time a memory transaction is made; and (c) notifying a processor with memory state data each time a change is made.

In preferred embodiments of the method, in step (c), the BMM, after storing a data structure into the memory, provides a data identifier for the structure on the link to the processor. Also in preferred embodiments the BMM, in step (b), in making memory transactions, updates the memory state map to the new memory state, keeping track of regions occupied by valid data and regions not occupied by valid data.

In some embodiments, in step (a), the BMM, in response to a signal that the processor is finished with certain identified data in the memory, copies the data from the memory to another device, and updates the memory state map to indicate the region of the data copied. There may further be a step for interrupting the BMM by the outside device when data is available to be transferred to the memory. The method is particularly well suited for processing data packets in a packet router, such as in the Internet.

In embodiments of the invention, taught in enabling detail below, for the first time an apparatus and methods are provided for complete background memory management, freeing processor power in systems like Internet packet routers, to accomplish more processing, by not being required to do memory management.

DESCRIPTION OF THE PREFERRED EMBODIMENTS

Figure 1:
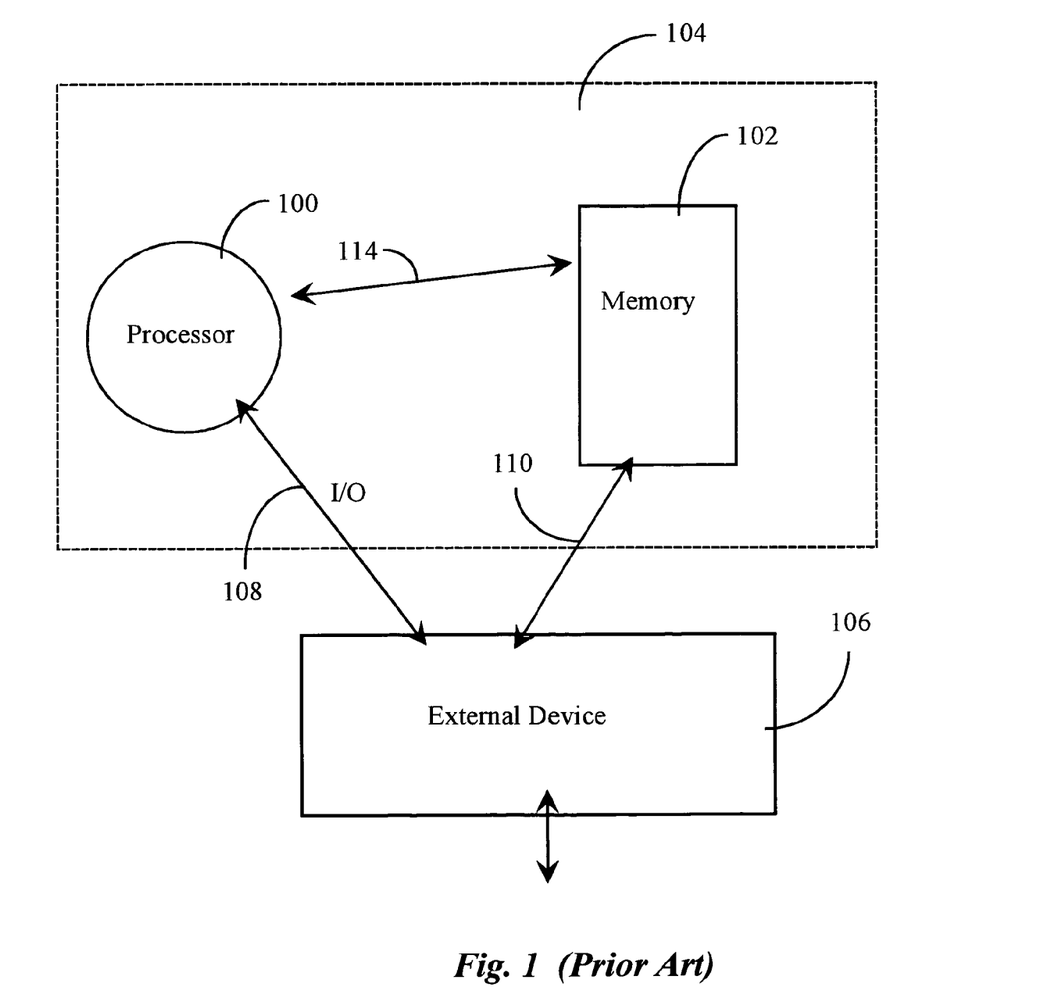
FIG. 1 is a simplified diagram of memory management by direct I/O processing in the prior art.

FIG. 1 is a simplified diagram of memory management in a system 104 comprising a processor 100 and a memory 102 in communication with a device 106. In this example it is necessary to bring data from device 106 into memory 102 for processing, and sometimes to transmit processed data from memory 102 to device 106, if necessary. Management in this prior art example is by processor 100, which sends I/O commands to and receives responses and/or interrupts from device 106 via path 108 to manage movement of data between device 106 and memory 102 by path 110. The processor has to determine whether a data structure can fit into available space in memory, and has to decide where in the memory to store incoming data structures. Processor 100 has to fully map and track memory blocks into and out of memory 102, and retrieves data for processing and stores results, when necessary, back to memory 102 via path 114. This memory management by I/O commands is very slow and cumbersome and uses processor resources quite liberally.

Figure 2:
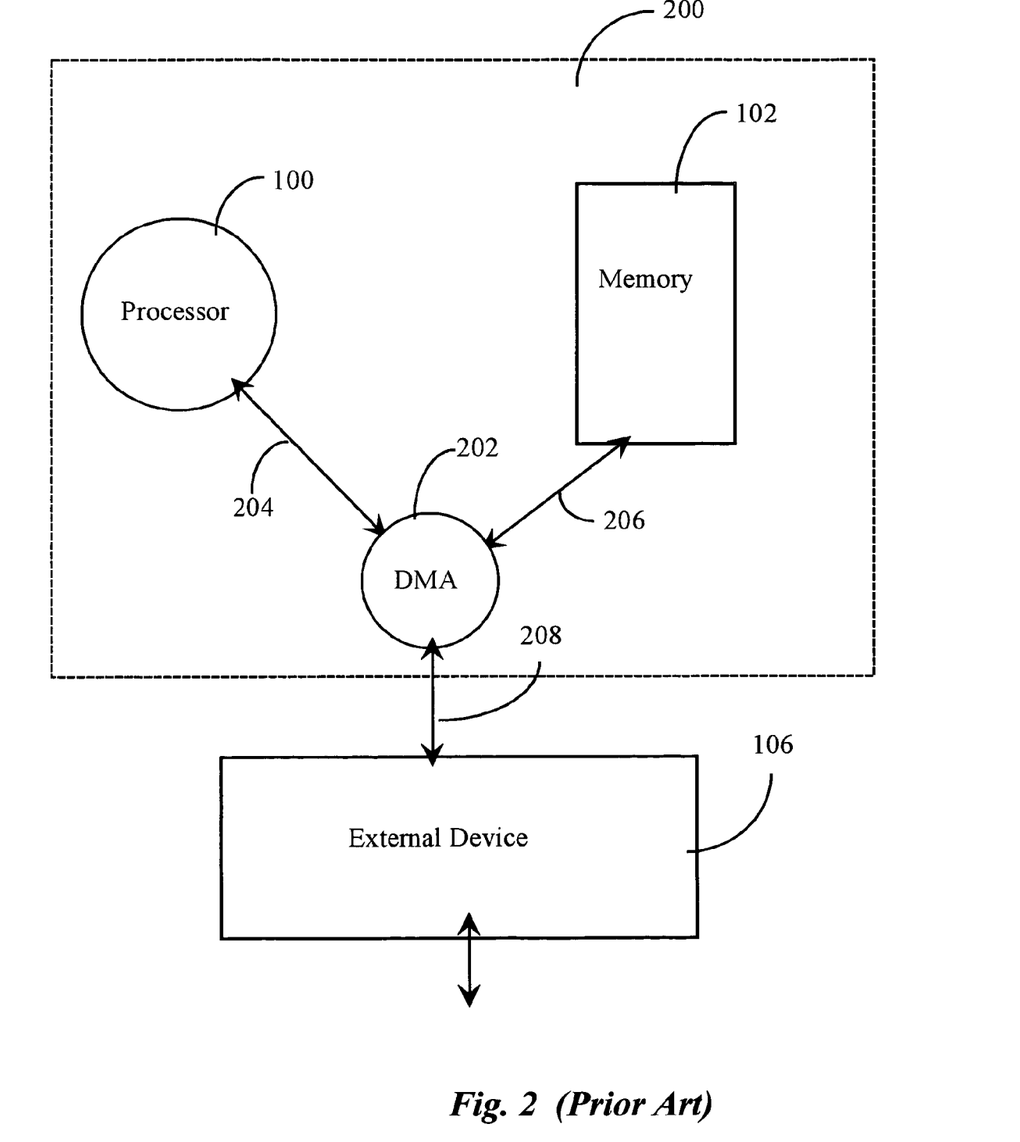
FIG. 2 is a simplified diagram of memory management by direct memory access in the prior art.

FIG. 2 is a simplified diagram of a processor system 200 in the prior art comprising a processor 100, a memory 102 and a direct memory access (DMA) device 202. This is the second of two systems by which data, in the conventional art, is brought into a system, processed, and sent out again, the first of which is by I/O operations as described just above. System 200 comprises a DMA device 202 which has built-in intelligence, which may be programmed by processor 100, for managing data transfers to and from memory 102. DMA device 202 is capable of compatible communication with external device 106, and of moving blocks of data between device 102 and 106, bi-directionally. The actual data transfers are handled by DMA device 202 transparently to processor 100, but processor 100 must still perform the memory mapping tasks, to know which regions of memory are occupied with data that must not be corrupted, and which regions are free to be occupied (overwritten) by new data.

In the system of FIG. 2 DMA processor 100 programs DMA device 202. This control communication takes place over path 204. DMA device 202 retrieves and transmits data to and from device 106 by path 208, and handles data transfers between memory 102 and processor 100 over paths 204 and 206.

In these descriptions of prior art the skilled artisan will recognize that paths 204, 206 and 208 are virtual representations, and that actual data transmission may be by various physical means known in the art, such as by parallel and serial bus structures operated by bus managers and the like, the bus structures interconnecting the elements and devices shown.

Figure 3:
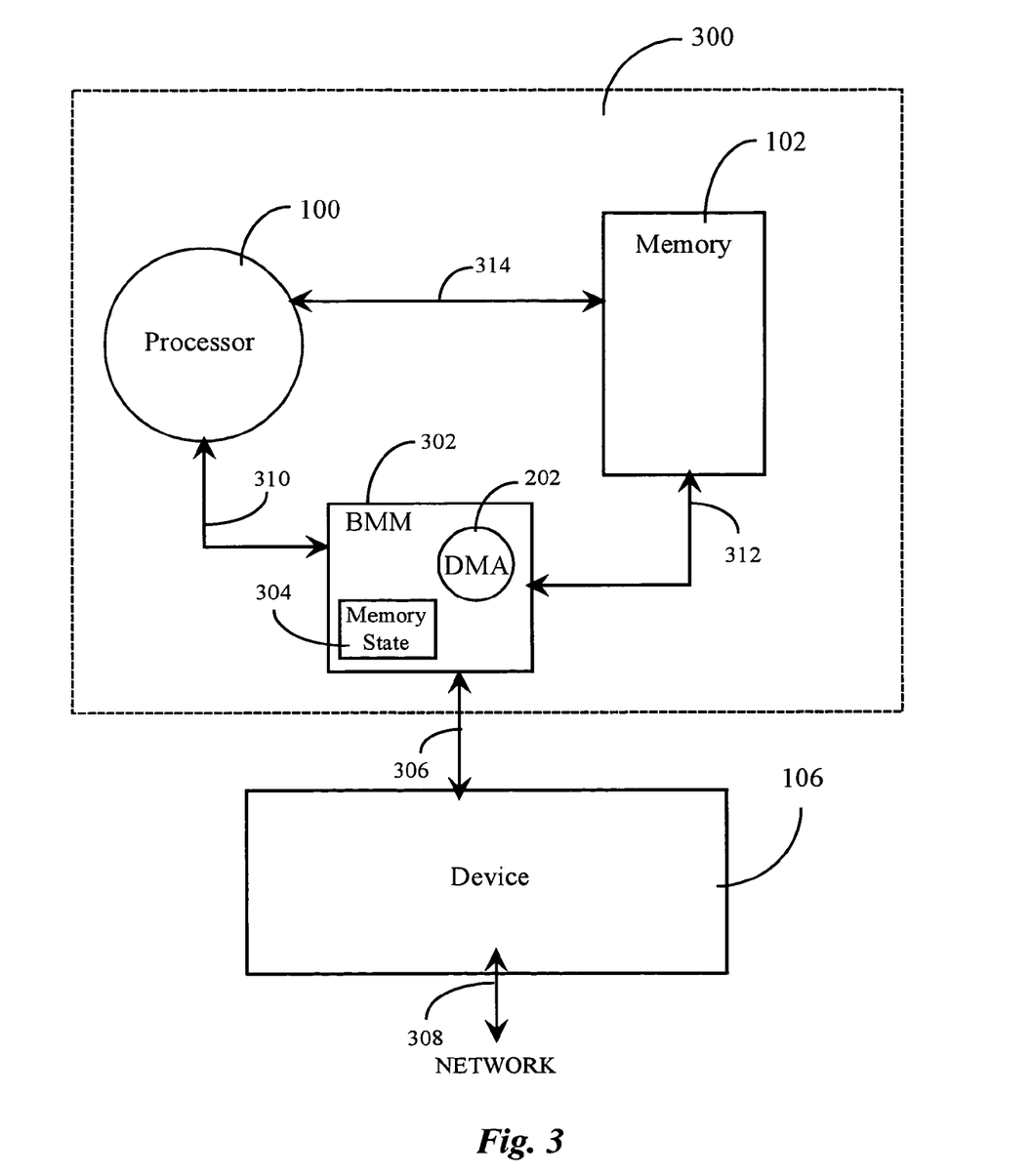
FIG. 3 is a diagram of memory management by a Background Memory Manager in a preferred embodiment of the present invention.

FIG. 3 is a schematic diagram of a system 300 including a Background Memory Manager (BMM) 302 according to an embodiment of the present invention. BMM 302 a hardware mechanism enabled to manage the memory in the background, i.e. with no intervention of the processor to decide where the data structure will be stored in the memory. Thus, the processor can utilize its resources for tasks other than to manage the memory.

The present invention in several embodiments is applicable in a general way to many computing process and apparatus. For example, in a preferred embodiment the invention is applicable and advantageous in the processing of data packets at network nodes, such as in routers in packet routers in the Internet. The packet processing example is used below as a specific example of practice of the present invention to specifically describe apparatus, connectivity and functionality.

In the embodiment of a packet router, device 106 represents input/output apparatus and temporary storage of packets received from and transmitted on a network over path 308. The network in one preferred embodiment is the well-known Internet network. Packets received from the Internet in this example are retrieved from device 106 by BMM 302, which also determines whether packets can fit into available regions in memory and exactly where to store each packet, and stores the packets in memory 102, where they are available to processor 100 for processing. Processor 100 places results of processing back in memory 102, where the processed packets are retrieved, if necessary, by BMM on path 312 and sent back out through device 106.

In the embodiment of FIG. 3 BMM 302 comprises a DMA 202 and also a memory state map 304. BMM 302 also comprises an interrupt handler in a preferred embodiment, and device 106 interrupts BMM 302 when a packet is received. When a packet is received, using DMA 202 and state map 304, the BMM performs the following tasks:

1. Decides whether a data structure fits into the memory. Whether the structure fits into memory, then, is a function of the size of the data packet and the present state of map 304, which indicates those regions of memory 102 that are available for new data to be stored.

2. If the incoming packet in step 1 above fits into memory, the BMM determines an optimal storage position. It was described above that there are advantages in sequential storage. Because of this, the BMM in a preferred embodiment stores packets into memory 102 in a manner to create a small number of large available regions, rather than a larger number of smaller available regions.

3. BMM 302 notifies processor 100 on path 310 when enough of the packet is stored, so that the processor can begin to perform the desired processing. An identifier for this structure is created and provided to the processor. The identifier communicates at a minimum the starting address of the packet in memory, and in some cases includes additional information.

4. BMM updates map 304 for all changes in the topology of the memory. This updating can be done in any of several ways, such as periodically, or every time a unit in memory is changed.

5. When processing is complete on a packet the BMM has stored in memory 102, the processor notifies BMM 302, which then transfers the processed data back to device 106. This is for the particular example of a packet processing task. In some other embodiments data may be read out of memory 102 by MM 302 and sent to different devices, or even discarded. In notifying the BMM of processed data, the processor used the data structure identifier previously sent by the BMM upon storage of the data in memory 102.

6. The BMM updates map 304 again, and every time it causes a change in the state of memory 102. Specifically the BMM de-allocates the region or regions of memory previously allocated to the data structure and sets them as available for storage of other data structures, in this case packets.

It will be apparent to the skilled artisan that there may be many alterations in the embodiments described above without departing from the spirit and scope of the present invention. For example, a specific case of operations in a data packet router was illustrated. This is a single instance of a system wherein the invention may provide significant advantages. There are many other systems and processes that will benefit as well. Further, there are a number of ways BMM 302 may be implemented to perform the functionality described above, and there are many systems incorporating many different kinds of processors that might benefit. The present inventors are particularly interested in a system wherein a dynamic multi-streaming processor performs the functions of processor 100. For these reasons the invention should be limited only by the scope of the claims as listed below.

What is claimed is:

1. A background memory manager (BMM) for managing a memory in a data processing system, the BMM comprising:
   circuitry for transfer a data structure to and from an outside device and to and from a memory; and
   a communication link;
   management logic coupled to a processor by the communication link and configured to determine if the data structure fits into the memory, to decide where, in a plurality of regions in the memory, to store the data structure, to perform data transfers between the outside device and the memory, to maintain a memory state map according to memory transactions made, and to inform the processor of new data and its location.

2. The BMM of claim 1, wherein the management logic is further configured to provide, for the data structure and when the data structure is stored, a data identifier on the communication link.

3. The BMM of claim 2, wherein the management logic is further configured to update, in response to the memory transactions, the memory state map to a new memory state to keep track of regions occupied by valid data and regions unoccupied by valid data.

4. The BMM of claim 2, wherein the management logic is further configured to copy, in response to a signal on the communication link that the processor is finished with identified data in the memory, the identified data from the memory to another device and to update the memory state map to indicate a new memory state for a region of the identified data data.

5. The BMM of claim 1, further comprising an interrupt handler configured to allow a remote data source to interrupt the BMM when data is available to be transferred to the memory.

6. The BMM of claim 1, wherein data handled by the BMM constitutes network data packets.

7. A data processing system, comprising:
   a processor;
   a memory coupled to the processor; and
   a background memory manager (BMM) coupled to the memory and the processor, the BMM including circuitry to transfer a data structure to and from an outside device and to and from the memory and including management logic configured to determine if the data structure fits into the memory, to decide where, in a plurality of regions in the memory, to store the data structure, to perform data transfers between the outside device and the memory, to maintain a memory state map according to memory transactions made, and to inform the processor of new data and its location.

8. The data processing system of claim 7, wherein the management logic is further configured to provide, for the data structure and when the data structure is stored, a data identifier to the processor.

9. The data processing system of claim 8, wherein the management logic is further configured to update, in response to the memory transactions, the memory state map to a new memory state to keep track of regions occupied by valid data and regions unoccupied by valid data.

10. The data processing system of claim 8 wherein the management logic is further configured to copy, in response to a signal from the processor that the processor is finished with identified data in the memory, the identified data from the memory to another device and to update the memory state map to indicate a new memory state for a region of the identified data data.

11. The data processing system of claim 7, further comprising an interrupt handler configured to allow a remote data source to interrupt the BMM when data is available to be transferred to the memory.

12. The data processing system of claim 7, wherein data handled by the BMM constitutes network data packets.

13. A network packet router, comprising:
an input/output (I/O) device configured to receive and to send a packet on the network;
a processor;
a memory coupled to the processor; and
a background memory manager (BMM) coupled to the memory and the processor, the BMM including circuitry configured to transfer the packet to and from the I/O device and to and from the memory and including management logic configured to determine if the packet fits into the memory, to decide where, in a plurality of regions in the memory, to store the packet, to perform data transfers between the I/O device and the memory, to maintain a memory state map according to memory transactions made, and to inform the processor of new data and its location.

14. The data router of claim 13 wherein the management logic is further configured to provide, for the packet and when the packet is stored, a data identifier to the processor.

15. The data router of claim 14, wherein the management logic is further configured to update, in response to the memory transactions, the memory state map to a new memory state to keep track of regions occupied by valid packets and regions unoccupied by valid packets.

16. The data router of claim 14, wherein the management logic is further configured to copy, in response to a signal that the processor is finished with a first packet in the memory, the first packet from the memory to the I/O device and to update the memory state map to indicate a new memory state for a region of the first packet packet.

17. The data router of claim 13, further comprising an interrupt handler configured to allow the I/O device to interrupt the BMM when packets are available to be transferred to the memory.

18. The data router of claim 13, wherein the BMM is further characterized by being configured to notify the processor when enough of the packet is stored for the processor to being to perform desired processing.

19. A method for managing a memory in a data processing system having a processor, the method comprising:
(a) transferring a data structure to and from an outside device and to and from the memory by circuitry in a background memory manager (BMM);
(b) determining by the BMM if the data structure from the outside device will fit into available space in the memory;
(c) deciding by the BMM exactly where, in a plurality of regions in the memory, to store the data structure; and
(d) updating a memory state map in the BMM when a memory transaction is made.

20. The method of claim 19, further comprising providing, for the data structure and when the data structure is stored, a data identifier on a link to the processor.

21. The method of claim 20, further comprising keeping track of regions occupied by valid data and regions unoccupied by valid data.

22. The method of claim 20, further comprising:
copying, in response to a signal that the processor is finished with identified data in the memory, the identified data from the memory to another device; and
updating the memory state map to indicate a new memory state for a region of the identified data.

23. The method of claim 19, further comprising interrupting the BMM by the outside device when data is available to be transferred to the memory.

24. The method of claim 19, wherein data handled by the BMM constitutes network data packets.

25. The method of claim 24, wherein the network data packets are conveyed on the Internet.

* * * * *

UNITED STATES PATENT AND TRADEMARK OFFICE
CERTIFICATE OF CORRECTION

PATENT NO. : 7,502,876 B1
APPLICATION NO. : 09/602279
DATED : March 10, 2009
INVENTOR(S) : Nemirovsky et al.

It is certified that error appears in the above-identified patent and that said Letters Patent is hereby corrected as shown below:

Column 6
In line 24, replace "circuitry for transfer" with --circuitry to transfer--.
In lines 49-50, replace "identified data data." with --identified data.--.

Column 7
In line 13, replace "8 wherein" should be replaced with --8, wherein--.
In line 20, replace "identified data data." with --identified data.--.
In line 43, replace "13 wherein" with --13, wherein--.

Column 8
In line 8, replace "first packet packet." with --first packet.--.
In line 16, replace "being" with --begin--.

Signed and Sealed this

First Day of September, 2009

David J. Kappos
*Director of the United States Patent and Trademark Office*